(12) United States Patent
Ajbani et al.

(10) Patent No.: US 7,264,868 B2
(45) Date of Patent: Sep. 4, 2007

(54) OVERMOLDED GRIP

(75) Inventors: Manoj Ajbani, Copley, OH (US); Christopher Kiehl, Akron, OH (US); Thierry Florent Edme Materne, Lasne (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 225 days.

(21) Appl. No.: 10/672,675

(22) Filed: Sep. 26, 2003

(65) Prior Publication Data

US 2005/0260394 A1 Nov. 24, 2005

Related U.S. Application Data

(60) Provisional application No. 60/414,722, filed on Sep. 30, 2002, provisional application No. 60/434,924, filed on Dec. 18, 2002.

(51) Int. Cl.
*B32B 15/06* (2006.01)
*B32B 25/08* (2006.01)

(52) U.S. Cl. ............... 428/217; 428/461; 428/462; 428/463; 428/521; 428/522

(58) Field of Classification Search ............. 428/461, 428/462, 463, 521, 522, 217
See application file for complete search history.

(56) References Cited

U.S. PATENT DOCUMENTS

| | | | |
|---|---|---|---|
| 3,686,364 A | 8/1972 | Robinson et al. | 260/876 |
| 3,758,643 A | 9/1973 | Fisher | 260/897 |
| 3,806,558 A | 4/1974 | Fisher | 260/897 |
| 3,865,776 A | 2/1975 | Gergen | 260/33.6 |
| 4,104,210 A | 8/1978 | Coran et al. | 525/232 |
| 4,130,535 A | 12/1978 | Coran et al. | 524/487 |
| 4,202,801 A | 5/1980 | Petersen | 525/232 |
| 4,250,273 A | 2/1981 | Bohm et al. | 525/99 |
| 4,271,049 A | 6/1981 | Coran | 525/191 |
| 4,311,628 A | 1/1982 | Abdou-Sabet et al. | 524/447 |
| 4,340,684 A | 7/1982 | Bohm et al. | 525/194 |
| 4,343,918 A | 8/1982 | Bohm et al. | 525/194 |
| 4,927,882 A | 5/1990 | Bayan | 525/99 |
| 5,051,478 A | 9/1991 | Puydak et al. | 525/195 |
| 5,239,009 A | 8/1993 | Halasa et al. | 525/258 |
| 5,248,729 A | 9/1993 | Inoue et al. | 525/92 B |
| 5,272,220 A | 12/1993 | Rodgers et al. | 525/332.3 |
| 5,334,677 A | 8/1994 | Razavi et al. | 526/114 |
| 5,448,003 A | 9/1995 | Hsu et al. | 526/181 |
| 5,476,914 A | 12/1995 | Ewen et al. | 526/351 |
| 5,597,867 A * | 1/1997 | Tsujimoto et al. | 525/74 |
| 5,677,402 A | 10/1997 | Halasa et al. | 526/174 |
| 5,679,751 A | 10/1997 | Halasa et al. | 526/174 |
| 5,844,044 A | 12/1998 | Sandstrom et al. | 525/237 |
| 6,140,434 A | 10/2000 | Halasa et al. | 526/174 |
| 6,289,959 B1 | 9/2001 | Hsu et al. | 152/450 |
| 6,293,325 B1 | 9/2001 | Hsu et al. | 152/450 |
| 6,313,216 B1 | 11/2001 | Christian et al. | 524/575 |
| 6,372,863 B1 | 4/2002 | Kerns et al. | 526/65 |
| 6,566,478 B1 | 5/2003 | Henning et al. | 526/335 |
| 6,723,776 B2 * | 4/2004 | Sakaki et al. | 524/474 |

* cited by examiner

*Primary Examiner*—Monique R. Jackson
(74) *Attorney, Agent, or Firm*—Alvin T. Rockhill

(57) ABSTRACT

The present invention discloses an article of manufacture comprising a soft thermoplastic elastomer composition overmolded onto a hard substrate, wherein the soft thermoplastic composition includes (a) 5 to 60 parts by weight of a thermoplastic resin, (b) 5 to 70 parts of a rubbery elastomer comprised of repeat units that are derived from a conjugated diene monomer, wherein the rubbery elastomer is optionally at least partially crosslinked, and wherein the rubbery polymer is a solution polymer, (c) 5 to 90 parts of a highly saturated elastomer selected from the group consisting of styrene-ethylene butylene-styrene polymers, styrene-ethylene propylene-styrene polymers, hydrogenated polybatadiene, hydrogenated polyisoprene, hydrogenated styrene-isoprene random copolymers, hydrogenated styrene-butadiene random copolymers, and (d) 15 to 200 parts by weight of an oil.

39 Claims, No Drawings

OVERMOLDED GRIP

This patent application claims the benefit of U.S. Provisional Patent Application Ser. No. 60/414,722, filed on Sep. 30, 2002, and U.S. Provisional Patent Application Ser. No. 60/434,924, filed on Dec. 18, 2002.

FIELD OF THE INVENTION

The present invention relates to the use of a soft thermoplastic elastomer composition overmolded on a hard substrate, such as a metal or a thermoplastic resin, for grips or handles on various household items.

BACKGROUND OF THE INVENTION

Plastic handles of various shapes and sizes are found on many household items. Such household items include toothbrushes, shaving razors, hairbrushes, pens, tools, kitchen appliances and kitchen utensils. These household items have a variety of functions, but in most cases, it is desirable for the user to grip the handle of these items firmly, so that it does not fall out of the user's hand. In other cases, such as with a knife or fork or a tool, it is desirable for the item to be gripped with even more firmness so that it can be leveraged.

Because the handles of these household items are normally made of a hard plastic, the simplest tasks can become problematic. As in the case of a toothbrush or shaving razor, the handle generally come into contact with water. When the toothbrush or razor is wet, it is difficult to grip and may slip out of the user's hands. Other items such as tools or kitchen utensils can have handles that are difficult to hold onto or uncomfortable to grip because of the hardness of the plastic material. For persons suffering from arthritis, carpal tunnel syndrome or other hand injuries or infirmities, using these basic household objects can become more difficult or even impossible.

Most people would prefer to grip objects with a softer handle that is more soothing to the touch and easier to grip. Accordingly, a need exists for a soft grip handle that can be grasped firmly and comfortably and which requires minimum strength and dexterity to grip and maneuver.

U.S. Pat. No. 4,250,273 suggests a thermoplastic elastomer composition comprising from about 10 to about 50 parts of a crystalline olefin polymer, from about 80 to about 15 parts by weight of a random styrene-butadiene rubber, and about 5 to about 55 parts by weight of a highly saturated elastomer.

U.S. Pat. No. 4,340,684 suggests a thermoplastic elastomer composition comprising from about 10 to about 50 parts of a crystalline olefin polymer, from about 80 to about 15 parts by weight of a random styrene-butadiene rubber, and about 5 to about 55 parts by weight of a highly saturated elastomer, where in the blend was partially cured so that a thermoplastic elastomer was formed which had a melt flow index of at least 1.0 when tested in accordance with ASTM D 1238 condition L at a load of 100 pounds. The authors suggest that when the melt flow rate of the formed blend was less than 1.0, thermosetting formulations were formed.

U.S. Pat. No. 4,343,918 claims the process for making a thermoplastic elastomer composition comprising from about 10 to about 50 parts of a crystalline olefin polymer, from about 80 to about 15 parts by weight of a random styrene-butadiene rubber, and about 5 to about 55 parts by weight of a highly saturated elastomer.

U.S. Pat. No. 4,927,882 claims a thermoplastic elastomer composition having a compression set less than about 30% and produced by dynamic vulcanization of SBR to form a dispersed phase of crosslinked SBR in a co-continuous matrix of SEBS and polypropylene. The compositions had specific use in the pharmaceutical applications.

There is a growing demand for a wide variety of articles that are soft and soothing to touch. It is, of course, also important for these articles to have the strength, durability, and rigidity needed in the applications where the articles is used. This can be accomplished by overmolding a soft thermoplastic composition onto on a hard thermoplastic substrate. However, there is a need for a soft thermoplastic elastomer composition that can be overmolded onto a hard thermoplastic resin substrate wherein the soft thermoplastic composition has lower hardness, good oil resistance and low compression set. There is currently a need for a thermoplastic composition that has superior feel and comfort as characterized by a lower modulus to that which is obtained by using syndiotactic polypropylene copolymer.

SUMMARY OF THE INVENTION

This invention relates to a thermoplastic elastomer that can be overmolded onto hard substrate, such as a plastic or metal surface. The thermoplastic elastomer composition of this invention offers the lower cost and lower hardness. It is also essentially odor-free, scratch resistant and can be colored as desired.

The present invention provides a low cost, gentle to the touch material for an easy to grip handle made from a soft thermoplastic elastomer composition overmolded on a hard thermoplastic resin substrate wherein the soft thermoplastic composition has lower hardness and superior feel and comfort. This invention provides a thermoplastic blend composition that has superior feel and comfort that is obtained by using a syndiotactic polypropylene.

The thermoplastic elastomer composition of this invention can be beneficially used in making grips or handles for articles of manufacture including, but not limited to, toothbrushes, shaving razors, hairbrushes, hairdryers, paintbrushes, pens, tools (saws, hammers, screwdrivers, wrenches, pliers), kitchen appliances (handles for refrigerator doors, ovens, dishwashers, bread warmers, trash compactors), kitchen utensils (spoons, forks, knives, spatulas, shish kabob skewers, vegetable peelers, can openers, bottle openers, corkscrews, whisks, basting brushes), vacuum cleaner handles, brooms, mops, rakes, shovels, scissors, sporting equipment (fishing poles, tennis rackets, firearms, and golf clubs), and dinghy brushes.

The present invention more specifically discloses an article of manufacture that is comprised of a soft thermoplastic elastomer composition overmolded onto a hard substrate, such as a metal or thermoplastic resin, wherein the soft thermoplastic composition is comprised of (a) 5 to 60 parts by weight of a thermoplastic resin selected from the group consisting of polyolefin resins and polystyrene, (b) 5 to 70 parts of a rubbery elastomer that is comprised of repeat units that are derived from a conjugated diene monomer selected from 1,3-butadiene and isoprene, wherein the rubbery elastomer is optionally at least partially crosslinked, wherein the repeat units in the rubbery polymer are distributed throughout the rubbery polymer in an essentially random manner, and wherein the rubbery polymer is a solution polymer, (c) 5 to 90 parts of a highly saturated elastomer selected from the group consisting of styrene-ethylene butylene-styrene polymers (SEBS), styrene-ethylene propylene-styrene polymers (SEPS), hydrogenated polybutadiene, hydrogenated polyisoprene, hydrogenated styrene-isoprene random copolymers, hydrogenated styrene-butadiene random copolymers, and (d) 15 to 200 parts by weight of an oil.

The subject invention further reveals a process for manufacturing an article of manufacture that comprises (1) melt blending (a) 5 to 60 parts by weight of a thermoplastic resin selected from the group consisting of polyolefin resins and polystyrene resins, (b) 5 to 70 parts of a rubbery elastomer that is comprised of repeat units that are derived from a conjugated diene monomer selected from 1,3-butadiene and isoprene, wherein the rubbery elastomer is optionally, at least partially crosslinked, wherein the repeat units in the rubbery polymer are distributed throughout the rubbery polymer in an essentially random manner, and wherein the rubbery polymer a solution polymer, (c) 5 to 90 parts of a highly saturated elastomer selected from the group consisting of styrene-ethylene butylene-styrene polymers (SEBS), styrene-ethylene propylene-styrene polymers (SEPS), hydrogenated polybutadiene, hydrogenated polyisoprene, hydrogenated styrene-isoprene random copolymers, hydrogenated styrene-butadiene random copolymers, (d) 15 to 200 parts by weight of an oil, and (e) a crosslinking agent to produce a soft thermoplastic composition, wherein the melt blending is conducted above the melt point of the thermoplastic resin, and wherein the crosslinking of the rubbery elastomer is conducted in a continuous mixer; (2) pelletizing the soft thermoplastic elastomer composition as it is being discharged from the continuous mixer, (3) overmolding the soft thermoplastic elastomer composition onto a hard substrate to produce the article of manufacture. In cases where the hard substrate is polystyrene or a polymer or copolymer that is synthesized from styrene monomer, it is preferred for the thermoplastic resin to be polystyrene to attain a better level of adhesion.

The present invention also discloses a polymeric composition which is comprised of (a) a syndiotactic polypropylene copolymer, (b) 5 to 70 parts of a rubbery elastomer that is comprised of repeat units that are derived from a conjugated diene monomer selected from 1,3-butadiene and isoprene, wherein the rubbery elastomer is at least partially crosslinked, wherein the repeat units in the rubbery polymer are distributed throughout the rubbery polymer in an essentially random manner, and wherein the rubbery polymer a solution polymer, (c) 5 to 90 parts of a highly saturated elastomer selected from the group consisting of styrene-ethylene butylene-styrene polymers (SEBS), styrene-ethylene propylene-styrene polymers (SEPS), hydrogenated polybutadiene, hydrogenated polyisoprene, hydrogenated styrene-isoprene random copolymers, hydrogenated styrene-butadiene random copolymers, (d) 15 to 200 parts by weight of an oil, and (e) a crosslinking agent.

DETAILED DESCRIPTION OF THE INVENTION

The thermoplastic resin is normally a polyolefin resin or polystyrene. The polyolefin resin can be polyethylene, isotactic polypropylene, syndiotactic polypropylene, polypropylene impact copolymers containing about 1-7 percent by weight of ethylene, butene, hexene, or octene, polyolefin copolymers such as ethylene-butene, hexene, or octene, polybutene, reactor grade modified polypropylene, oxypolyolefin, or metallocene polypropylene. Syndiotactic polypropylene resins are highly preferred. Isotactic polypropylene copolymers with ethylene, butene or hexene that are prepared with traditional Ziegler-Natta catalyst (non-metallocene catalyst) are also highly preferred.

Syndiotactic polypropylenes that are described in U.S. Pat. No. 5,476,914 and U.S. Pat. No. 5,334,677 may be used in preparing the thermoplastic elastomer compositions. The teachings of U.S. Pat. No. 5,476,914 and U.S. Pat. No. 5,334,677 are incorporated herein by reference. The syndiotactic polypropylenes used may be homopolymers or copolymers. The syndiotactic polypropylenes utilized in the present invention comprise at least 15 percent syndiotactic molecules, more preferably at least 50 percent syndiotactic molecules, and most preferably at least 82% syndiotactic molecules. Syndiotactic homopolymers or copolymers with ethylene may be used. For instance, commercial syndiotactic polypropylenes, such as those sold by Atofina may be used. The syndiotactic polypropylene used will preferably have a melt flow rate greater than 0.5 g/10 minutes at 230° C./2.16 kg load as determined by ASTM D 1238, more preferably between 10 and 110 g/10 minutes.

A reactor grade impact modified polypropylene can also be used. A publication article in Modern Plastics Encyclopedia/89, mid October 1988 Issue, Volume 65, Number 11, pages 86-92, describes several types of polypropylenes, which is incorporated herein as a reference for the types of polypropylenes that may be used in the blends of the said invention. Metallocene based polypropylene resins that may be produced by single-site technology can also generally be used. The polypropylene produced by methods described in "Metocene™, Precise Tailoring of Polypropylene Resins Using Single-Site Technology, David Fischer, Presented at the SPE Automotive TPO Global Conference 2001, Hyatt Regency, Dearborn, Mich., Oct. 1-3, 2001, can also normally be used. The teachings of this reference are incorporated herein by reference.

Reactor grade thermoplastic olefins (TPOs) as produced by Basell Polyolefins and as described in TPE 2003 Conference Proceedings, RAPRA Technology Limited, Brussels, Belgium, Sep. 16-17, 2003, page 73 may also be used as a resin when a lower modulus and low hardness soft grip is desired. A linear low-density polyethylene resin may also be used for lower modulus soft-grips.

The olefinic resin used may be used at a level of about 5 to about 60 parts, preferably at a level of about 10 to about 40 parts, and most preferably at a level of about 15 to about 30 parts based upon 100 parts of total thermoplastic elastomer blend composition.

The elastomer polymerized by solution polymerization techniques can be a diene elastomer that is made with polymerization in a solvent such as hexane or cyclohexane. Such elastomers are well known to those skilled in this art. U.S. Pat. No. 6,566,478, U.S. Pat. No. 6,313,216, U.S. Pat. No. 6,372,863, U.S. Pat. 6,293,325, U.S. Pat. No. 6,289,959, U.S. Pat. No. 6,140,434, U.S. Pat. No. 5,844,044, U.S. Pat. No. 5,679,751, U.S. Pat. No. 5,677,402, U.S. Pat. No. 5,448,003, U.S. Pat. No. 5,239,009 and U.S. Pat. No. 5,272,220 generally describe such elastomers and methods for their synthesis. The teachings of these United States patents are incorporated herein by reference with respect to their description of such elastomers and their synthesis. The elastomers used will be substantially random. Solution elastomers such as synthetic-polyisoprene may also be used. The solution elastomers used may be styrene-butadiene random copolymer or styrene-isoprene random copolymer with about 10 to about 40% by weight of bound styrene content. The Mooney viscosity of the said solution elastomer may be in the range of about 15 to about 120 Mooney as measured per ML 1+4 at 100° C. The solution elastomer may be used from about 5 to about 70 parts, more preferably from 10 to about 60 parts, most preferably from 20 parts to about 40 parts by weight of total thermoplastic elastomer blend composition. The styrene butadiene rubber will preferably have a vinyl content which is within the range of 10 to 60%.

The rubbery elastomers that can further be used in the soft thermoplastic composition of this invention include ethylene-propylene-diene rubber, butyl rubber, halobutyl rubber, ethylene-co-octene elastomer, halogenated rubber copolymers of p-alkylstyrene and at least one isomonoolefin having from 4 to 7 carbon atoms, and nitrile rubber.

The highly saturated elastomers that may be used in this invention are selected from the group of styrene-ethylene butylene-styrene (SEBS), styrene-ethylene propylene-styrene (SEPS), hydrogenated polybutadiene, hydrogenated polyisoprene, hydrogenated styrene-isoprene random copolymer, styrene-ethylene propylene (SEP) block copolymer, styrene-ethylene ethylene propylene-styrene (SEEPS) and hydrogenated styrene-butadiene random copolymer. The hydrogenation of random diene copolymers are described by authors E. W. Duck, J. R. Hawkins, and J. M. Locke, in Journal of the IRI, 6, 19, 1972, which may be used as the highly saturated elastomer in this invention and is incorporated herein as a reference. The saturated triblock polymers, SEBS and SEPS, with styrene end blocks are also used in this invention as the saturated elastomers. SEBS and SEPS are obtained on the hydrogenation of triblock copolymers of styrene and butadiene or styrene and isoprene and are known to be commercially available. Some commercial available examples of such elastomers include Kraton® G series polymers. U.S. Pat. No. 3,686,364 and U.S. Pat. No. 3,865,776 give some examples of block copolymers that may be used in the practice of this invention and are incorporated herein by reference. It is highly preferred that the highly saturated elastomer to be SEBS having a bound styrene content that is within the range of 15 weight percent to about 40 weight percent.

It is possible to use the saturated block copolymers that are modified versions of SEBS. Such modified block copolymers additionally have a substantial number of styrene units that are randomly distributed in the rubber midblocks of ethylene and butylene. These modified saturated block copolymers are supplied under Kraton® 'A' series. Saturated block copolymers grades as mentioned in TPE 2003 RAPRA Conference Proceedings, Brussels, Belgium, Sep. 16-17, 2003, Paper 18, Page 157, and Paper 21, page 181 may also be used and are incorporated herein by reference.

A hydrogenated diblock elastomers of styrene and butadiene or styrene and isoprene can also be used as the highly saturated elastomers even though triblock elastomers are highly preferred. The highly saturated elastomers as used in this invention means that at least 75 percent of the original double bonds of the isoprene or butadiene units present prior to hydrogenation have been saturated by hydrogenation, more preferably at least 90 percent and most preferably 95 percent of the original double bonds have been saturated.

The highly saturated elastomer may be used from about 5 to about 90 parts, more preferably from 15 to about 70 parts, most preferably from about 25 parts to about 60 parts by weight of total thermoplastic elastomer blend composition.

The thermoplastic elastomer blend compositions formed by blending a polyolefin and/or polystyrene resin, a substantially random elastomer, and a highly saturated elastomer may be overmolded on a hard thermoplastic resin substrate where the thermoplastic resin has a glass transition temperature or a melt transition temperature of at least 70° C. as measured in a differential scanning calorimeter at a heating rate of 10° C. per minute. The hard substrate may be selected from thermoplastic resins selected from the group consisting of polypropylene, polyethylene, polycarbonate, polybutylene terpthalate, polyamides such as nylon 6, nylon 11, acrylonitrile-butadiene-styrene copolymer (ABS), styrene-acrylonitrile copolymer, polyacetal, and the like. The hard substrate can also be a metal.

The soft thermoplastic elastomer blend composition will also contain a processing oils, such as a paraffinic oil and/or a naphthenic oil. The oil will typically be present at a level within the range of 15 to about 200 parts by weight. The oil will more typically be present at a level within the range of about 20 to 150 parts by weight and will preferable be present at a level which is within the range of 20 to 70 parts by weight. The soft thermoplastic elastomer blend composition will preferably contain a processing oil. Examples of such oils that can be used include Paralux™ process oils 701R, 1001R, 2401R, 6001R, from Chevron and the like. It is preferred to use an oil with a high flash point for better retention of the oil. Naphthenic oils are preferred with for use in blends having a relatively high styrene content and paraffinic oils are preferred for utilization in conjunction with blends having a relatively low styrene content. In this invention, elastomers and rubbers are used interchangeably. The terms, vulcanized, crosslinked, and cured are also used interchangeably herein.

The soft thermoplastic elastomer blend composition may also contain reinforcement or fillers selected from the group consisting of talc, clay, calcium carbonate, silica, carbon black, and wollastonite.

The hard thermoplastic resin substrate may also contain a reinforcement selected from the group consisting of talc, wollastonite, calcium carbonate, glass fibers, glass spheres, and silica.

The preparation of the soft-thermoplastic elastomer composition may be carried out in a continuous mixer, or a combination of a continuous mixer and a batch mixer. When a batch mixer is used, the discharged and uncrosslinked blend may be fed through a single screw-extruder and pelletized. When a continuous mixer is used, the blend may be pelletized after discharging from the twin-screw extruder. The dynamic vulcanization of the unsaturated diene elastomer or rubbery polymer or elastomer will be preferably carried out in a continuous mixer such as a twin-screw extruder or a Farrel continuous mixer.

The soft-thermoplastic elastomer composition can be comprised of a continuous matrix phase of the thermoplastic resin with the rubbery elastomer and the highly saturated elastomer being present as dispersed phases. In another embodiment of this invention the rubbery polymer, the thermoplastic resin, and the highly saturated elastomer can all be present in the soft-thermoplastic elastomer as co-continuous phases. In still another embodiment of this invention the highly saturated elastomer can be present as the continuous matrix phase with the thermoplastic resin and the rubbery elastomer being present as dispersed phases.

A crosslinking agent such as peroxide may be used to crosslink the elastomer, or SEBS or both to modify the mechanical properties and improve oil resistance and compression set. If polypropylene resin is used, there may be a further reduction in the melt viscosity due to the reduction of the molecular weight of the polypropylene. If a polyethylene resin is used, the resin may also be crosslinked. The resistance of the overmolded thermoplastic elastomer composition to the paraffinic oils may be improved by increasing the styrene content in the solution styrene-co-butadiene random copolymer or solution styrene-co-isoprene random copolymer that may be used for the thermoplastic elastomer composition, more preferably from 10 to about 40 percent by weight of the said solution SBR or solution styrene-co-isoprene random copolymer.

It is possible to pre-blend the solution diene elastomer with the polypropylene in the first mixing step and optionally crosslinking the diene rubber fully or partly. It is then possible to mix the blend of the fully or partially crosslinked diene rubber and polypropylene formed in the first step with the highly saturated elastomer in a second mixing step. This two-step mixing sequence may ensure crosslinking of only the diene rubber phase and not the highly saturated elastomer, particularly when the crosslinking agent is a peroxide-based curing agent. The dynamic vulcanization of the rubbery elastomer is preferably carried out in a continuous process, more particularly in a twin-screw extruder. The dynamic vulcanization of the unsaturated diene elastomer or rubbery polymer or elastomer will be preferably carried out in a continuous mixer such as a twin-screw extruder or a Farrel continuous mixer.

Thermoplastic elastomer compositions may be further modified with compounds or compatibilizers that contain functional and polar groups that have high affinity towards the thermoplastic being overmolded. Such compounds or compatilizers are well known to those skilled in this art. Few examples of the compatibilizers include maleated-ethylene propylene diene rubber, ethylene-co-ethyl or butyl acrylate-co-glycidyl methacrylate, maleated polypropylene, chlorinate-polypropylene, ethylene-co-acrylic acid and the like. The functional group containing compounds enhance the adhesion between the overmolded soft-thermoplastic elastomer and the hard thermoplastic resin substrate.

The overmolding of the soft thermoplastic composition can be achieved by a two shot or multi-component injection molding process or co-injection molding process. Such processes are generally described in "Special Technologies for Injection Moulding of TPE", Peter Pokomy, Engel Maschinebau GmbH, TPE 2000, 6 & 7 Mar. 2000, Paper 17, Amsterdam, conference proceedings. The teaching of this reference are incorporated herein by reference. The soft-thermoplastic elastomer overmolded onto the hard thermoplastic resin substrates are also described in "New Horizons in Thermoplastic Elastomers", Stephen J. Duckworth, M. A. Hanna Engineered Materials Europe, TPE 2000, 6 & 7 Mar. 2000, Paper 5, Amsterdam, and the teaching thereof are also incorporated herein by reference.

The soft overmolding can also be accomplished by insert injection molding carried out in two steps. In the first step, the thermoplastic substrate is molded and is subsequently inserted in another cavity for overmolding in the next step into the soft thermoplastic elastomer. The soft thermoplastic elastomers can be overmolded on a rigid metal substrate by insert injection molding processes.

The soft thermoplastic elastomer composition can also be processed by either an extrusion or an injection molding process and the formed soft sleeve can be slipped onto the solid thermoplastic or metal substrate.

The thermoplastic elastomer blends may also contain antiozonants and oxidants that are known to a rubber chemist of ordinary skill. The antiozonants may be physical protectants such as waxy materials that come to the surface and protect the part from oxygen or ozone or they may chemical protectors. The chemical protectors may be selected from the class of styrenated phenols, butylated octylated phenol, butylated di(dimethylbenzyl)phenol, p-phenylenediamines, butylated reaction products of p-cresol and Dicyclopentadiene (DCPD, polyphenolic antioxidants, hydroquinone derivatives, quinoline, diphenylene antioxidants and thioester antioxidants and the like and their blends. Some representative trade names of suitable products include Wingstay® S antioxidant, Wingstay® T antioxidant, Polystay® C antioxidant, Polystay® 100 antioxidant, Polystay® 100 AZ antioxidant, Polystay® 200 antioxidant, Wingstay® L antioxidant, Wingstay® LHLS antioxidant, Polystay® K antioxidant, Polystay® 29 antioxidant, and Wingstay® SN-1. The antioxidants and antiozonants used will preferably be non-staining and non-migratory. For applications that require non-black pigmentation or compositions where the natural color may be desired, carbon black may not be used and above mentioned antioxidants and antiozonant may be used instead. It is important that the said elastomer contains a significant portion of the antioxidant and antiozonant and/or carbon black (whenever used) in the said blends.

For providing additional stability against UV radiation, hindered amine light stabilizers (HALS) and UV absorbers may be also used in the thermoplastic elastomer composition. A skilled person is aware of such stabilizers. For example, Tinuvin® RTM 123, 144, 622, 765, 770 and 780, and Chemisorb® TTM-944 and the like may be employed. These kinds of UV stabilizers are available from Ciba Specialty Chemicals and Cytex Industries.

When the solution elastomeric phase is fully or partially cured in the thermoplastic elastomer compositions, curatives of the known art may be employed. The curing may be accomplished by dynamic vulcanization, wherein the rubber phase is generally crosslinked simultaneously as it is being mixed with the thermoplastic resin. The curatives may be selected from sulfur based, peroxide based, or phenolic based curatives. U.S. Pat. No. 3,758,643, U.S. Pat. No. 3,806,558, U.S. Pat. No. 5,051,478, U.S. Pat. No. 4,104,210, U.S. Pat. No. 4,130,535, U.S. Pat. No. 4,202,801, U.S. Pat. No. 4,271,049, U.S. Pat. No. 4,340,684, U.S. Pat. No. 4,250,273 4,927,882, U.S. Pat. No. 4,311,628 and U.S. Pat. No. 5,248,729 teach the type of curing or crosslinking agents and methods that can be utilized and the teaching of these references are incorporated herein by reference.

When sulfur based curing agents are employed for curing the diene containing solution elastomer, accelerators and cure activators may be used. Accelerators are used to control the time and/or temperature required for dynamic vulcanization and to improve the properties of the thermoplastic composition. In one embodiment, a single accelerator system may be used, i.e., primary accelerator. The primary accelerator(s) may be used in total amounts ranging from about 0.5 to about 4, preferably about 0.8 to about 1.5 phr (parts by weight per hundred parts by weight of rubber). In another embodiment, combinations of a primary and a secondary accelerator might be used with the secondary accelerator being used in smaller amounts, such as from about 0.05 to about 3 phr, in order to activate and to improve the properties of the thermoplastic elastomer composition. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. Certain processing aids and cure activators such as stearic acid and zinc oxide (ZnO) may also be used. When peroxide based curing agents are used, co-activators or coagents that are known to a rubber chemist of ordinary skill may be used in combination with the peroxides. These coagents may include trimethylolpropane triacrylate (TMPTA), trimethylolpropane trimethacrylate (TMPTMA), triallyl cyanurate (TAC), triallyl isocyanurate (TAIC), and the like. The peroxide crosslinkers and the coagents that may be employed for partial or complete dynamic vulcanization can be selected from the journal publication, "Peroxide Vulcanization of Elastomer", Vol. 74, No 3, July-August 2001, the teachings of which are incorporated here by reference. Hydrosilation crosslinking may also be employed to crosslink the diene-containing rubbery elastomer.

When the elastomer is at least partially crosslinked, the degree of crosslinking may be measured by dissolution of the blend in a solvent for specified duration, and using certain calculations to compensate for the insoluble or resin portion and then calculate % gel or unextractable rubber. The percent gel would normally increase with increasing crosslinking level. These techniques are well defined and established and are known to the persons that are skilled in this art. The percent gel content in the thermoplastic blends, more so in the TPVs may be anywhere in the range of about 5% to 100%.

The soft thermoplastic elastomer compositions overmolded on a hard thermoplastic resin substrate may be used in a shaving razor, toothbrush, pen grips, power tools, kitchen appliances, utensils, and keypads.

The Young's modulus of the soft thermoplastic elastomer blend composition as measured by the initial slope of the stress strain curve in a tensile measurement such as ASTM D 638 will be preferably at least 10 MPa less than the Young's modulus of the hard substrate.

This invention is illustrated by the following examples that are merely for the purpose of illustration and are not to be regarded as limiting the scope of the invention or the manner in which it can be practiced. Unless specifically indicated otherwise, parts and percentages are given by weight.

Table 1 lists thermoplastic elastomer masterbatch compositions that were prepared with a saturated elastomer Kraton® G 1650, a polypropylene random copolymer, Atofina 7823 MZ, a solution polymerized styrene-butadiene random copolymer elastomer, Solflex® 2515 or EPDM elastomer, Royalene® IM 7100, from Crompton Corporation, and talc partitioning agent in the first step mixing process. Solflex® 2515 is a low vinyl (about 15%), and about 25 weight % bound styrene containing solution polymerized random styrene-butadiene copolymer produced by The Goodyear Tire & Rubber Company. Polypropylene 7823M is the isotactic random copolymer of propylene and another olefin comonomer, supplied by Atofina and is prepared with Zieglar Natta catalyst (non-metallocene catalyst) technology, with about 6 weight % of random comonomer units, and a melt flow rate of about 30 g/10 minutes at 230° C./2.16 Kg load, and a melt point transition (peak) temperature range of about 145-155° C. Kraton® G1650 is a medium molecular weight saturated SEBS elastomer from Kraton Polymers. The weight average (Mw) and number average (Mn) molecular weights of Kraton® G 1650 were measured by Size Exclusion Chromatography as 55,000 and 52,000 g/mole respectively. In Examples 1-4, the SBR or EPDM content of the masterbatch is higher than the SEBS content.

TABLE 1

Masterbatch Composition in Weight %

| | No | | | |
|---|---|---|---|---|
| | 1 | 2 | 3 | 4 |
| Solflex 2515* | 52.89 | 52.89 | 52.89 | — |
| Royalene ® IM7100* | — | — | — | 52.89 |
| Atofina 7823 Mz | 27.11 | 27.11 | 27.11 | 27.11 |
| Kraton ® G1650 | 20 | 20 | 20 | 20 |
| Total | 100 | 100 | 100 | 100 |

*amount contains about 7.53 phr (parts per hundred SBR or EPDM rubber) of talc partitioning agent Soft and oil extended thermoplastic elastomers were prepared with compositions given in Table 2. Masterbatch compositions of Examples 1, 2, 3, and 4 were used to prepare Examples 7, 8, 9, and 10 respectively as given in Table 2. Additionally, naphthenic oil was added to oil extend the elastomers and a crosslinking agent was added to crosslink the SBR or EPDM rubber molecules. The masterbatch and soft and oil extended formulations were prepared in a Coperion ZSK25, 25 mm co-rotating, twin-screw extruder with an L/D of 48 and 12 barrels. Operating conditions of 300 RPM, 180° C., and 20 lbs/hour were used to prepare the masterbatch. Operating conditions of 300 RPM, 200° C., barrel temperatures and throughput 14.1 lb/hour were used to prepare the soft and oil extended formulations. The injection point of the oil was barrel 7 and the addition point for all other ingredients was the main feed hopper of the extruder.

TABLE 2

Soft and Oil Extended TPE Formulations
Compositions in Weight % with Low SEBS Content

| | No | | | | | |
|---|---|---|---|---|---|---|
| | 5+ | 6+ | 7 | 8 | 9 | 10+ |
| Solflex 2515* | — | — | 34.99 | — | — | — |
| Solflex 2515** | — | — | — | 37.37 | — | — |
| Solflex 2515*** | — | — | — | — | 35.12 | — |
| Royalene ® IM7100** | — | — | — | — | — | 37.37 |
| Atofina 7823 Mz | 17.93 | 17.93 | 17.93 | 17.27 | 17.89 | 17.27 |
| Kraton ® G1650 | 48.22 | 13.23 | 13.23 | 12.76 | 13.22 | 12.76 |
| Kraton ® D1101**** | — | 34.99 | — | — | — | — |
| Renoil 471***** | 33.85 | 33.85 | 33.85 | 32.6 | 33.77 | 32.6 |
| Total | 100 | 100 | 100 | 100 | 100 | 100 |

+Control
*Amount incorporates 7.53 phr of talc
**Amount incorporates 7.53 phr of talc, 9.23 phr of Poly-dispersion WBC-559P Firm 50C of Rhein Chemie (65% SP 1055 Phenolic Curative of Schenectady Chemicals), 1.5 phr of Zinc Oxide powder, and 1.02 phr of anhydrous Stannous Chloride from Aldrich Chemicals
***Amount incorporates 7.53 phr of talc and 0.625 phr of a peroxide curing agent (Vulcup ® 40 KE of Geo Specialty Chemicals)
****Styrene-Butadiene-Styrene (SBS) non-hydrogenated triblock copolymer of Kraton Polymers
*****Clear Naphthenic oil from Renkert Oil, PA.

The physical properties of the soft TPE formulations of Table 2 were tested and are given below in Table 3.

Measurement of the physical properties of the compositions disclosed in this invention were performed in accordance with the following ASTM Standard Test Methods; Durometer hardness D2240-00, tensile properties D412-98a test method A, tear strength D624-00, flexural properties D790-00, compression set D395-01 method B, and effect of liquids D471-98.

TABLE 3

Properties of Soft and Oil Extended TPE Formulations

| | No | | | | | |
|---|---|---|---|---|---|---|
| | 5+ | 6+ | 7 | 8 | 9 | 10+ |
| Shore A Hardness | 63 | 66 | 53 | 62 | 56 | 64 |
| Tensile Strength (Mpa) | 5.7 | 4.7 | 2.3 | 3.5 | 3.4 | 5.4 |
| Tear Strength (N/mm) | 37.9 | 30.9 | 18.5 | 13.0 | 13.2 | 23.1 |
| Flexural Modulus (Mpa) | 26.9 | 22.2 | 15 | 16.8 | 12.4 | 18.8 |
| % Compression Set B | | | | | | |
| @ 23 C. | 21 | 25 | 39 | 13 | 14 | 18 |
| @ 70 C. | 95 | 97 | 87 | 71 | 63 | 63 |
| % Weight Gain IRM Oil 903 | | | | | | |
| @ 70 C. | 75 | 73 | 81 | 51 | 58 | 81 |

+Control

The TPE formulations of Table 3 were insert overmolded on a cylinderical rigid polypropylene substrate to simulate a soft pen-grip. The TPEs molded well and had a good surface appearance. The oil in the uncrosslinked SBR containing Example 7 appeared to be leaching on the surface. Upon crosslinking of the SBR phase as done in Examples 8 and 9, the leaching was not seen. The soft TPEs prepared with crosslinked SBR were functional and had adequate strength and excellent appearance. The soft portion of the overmolded TPE were immersed in a beaker containing water. The surface of the immersed TPEs were rubbed against the thumb and two fingers that constitute a grip. The SBR containing TPEs Examples 7, 8, and 9 had the best wet grip characteristics, that was followed by Examples 10, 6, and 5 in the aforementioned order. The Examples 8 and 9 that contain SBR that was crosslinked with phenolic and peroxide curing agents respectively, had the lowest weight gain (i.e. best oil resistance) and low compression set. Good oil resistance is required for grips used in power tools, kitchen utensils, pens, stapler holder. Also, good wet grip character is needed in many grip applications that require water contact of the grip.

Transmission Electron Microscopy (TEM) was performed on the samples of Example 8 with proper staining techniques to identify the three polymeric phases. The polypropylene phase was observed as the continuous matrix phase. The SEBS domains were predominantly observed to be surrounding the crosslinked SBR domains and were dispersed in the polypropylene. The majority of crosslinked SBR domains were greater than 1 micron and few crosslinked SBR domains were less than 0.5 microns. This demonstrates that in an oil extended formulation containing SEBS, crosslinked SBR, and polypropylene, a low compression set, good oil resistance, and good wet grip characteristic thermoplastic elastomer is obtained when the polypropylene phase is a continuous matrix phase.

Masterbatch as given in Table 4 were prepared where the SEBS content was higher than the SBR or EPDM content by using similar methodology as in Examples 1-4.

TABLE 4

Masterbatch Composition in Weight %

| | No | |
|---|---|---|
| | 11 | 12 |
| Solflex 2515* | 29.4 | — |
| Royalene ® IM7100* | — | 29.4 |
| Atofina 7823 Mz | 16.1 | 16.1 |
| Kraton ® G1650 | 54.5 | 54.5 |
| Total | 100 | 100 |

*amount contains about 7.53 phr (parts per hundred) of talc partitioning agent

Soft and oil extended TPE formulations were prepared as given in Table 5 by using similar methodology as in Examples 5-10. Masterbatch compositions of Examples 11 and 12 were used to prepare Examples 15 and 16 respectively as given in Table 4. Additionally, naphthenic oil, and crosslinking agents were added to oil extend the elastomers and crosslink the SBR or EPDM rubber molecules. The SEBS content in the TPE formulations was high and polypropylene content was low.

TABLE 5

Soft and Oil Extended TPE Formulations
Compositions in Weight % with High SEBS Content

| | No | | | |
|---|---|---|---|---|
| | 13+ | 14+ | 15 | 16+ |
| Solflex 2515* | — | — | 21.25 | — |
| Royalene ® IM7100* | — | — | — | 21.25 |
| Atofina 7823 Mz | 10 | 10.7 | 10.5 | 10.5 |
| Kraton ® G1650 | 52 | 36.3 | 35.5 | 35.5 |
| Kraton ® D1101 | — | 19.6 | — | — |
| Renoil 471 | 38 | 33.4 | 32.75 | 32.75 |
| Total | 100 | 100 | 100 | 100 |

+Control
*Amount incorporates 7.53 phr of talc, 9.23 phr of Poly-dispersion WBC-559P Firm 50C of Rhein Chemie (65% SP 1055 Phenolic Curative of Schenectady Chemicals), 1.5 phr of Zinc Oxide powder, and 1.02 phr of anhydrous Stannous Chloride from Aldrich Chemicals The soft TPE formulations of Table 5 were tested for physical properties and results are given in Table 6.

TABLE 6

Properties of Soft and Oil Extended TPE Formulations

| | No | | | |
|---|---|---|---|---|
| | 13+ | 14+ | 15 | 16+ |
| Shore A Hardness | 51 | 55 | 51 | 54 |
| Tensile Strength (Mpa) | 5.4 | 6.1 | 4.2 | 4.6 |
| Tear Strength (N/mm) | 31.5 | 27.6 | 17.6 | 25.4 |
| Flexural Modulus (Mpa) | 17.5 | 14.1 | 7.5 | 8.5 |
| % Compression Set B | | | | |
| @ 23 C. | 18 | 17 | 13 | 12 |
| @ 70 C. | 102 | 98 | 92 | 91 |
| % Weight Gain IRM Oil 903 | | | | |
| @ 70 C. | 150 | 94 | 82 | 118 |

+Control

The soft TPEs of Table 5 were insert overmolded in a two step injection molding process. The hard polypropylene insert was molded first. The insert was then placed in another cavity in the mold and the TPE formulations were overmolded in the second step. The soft TPEs prepared with crosslinked SBR were functional and had adequate strength and excellent appearance. The soft portion of the overmolded TPEs of Examples 13-16 were immersed in a beaker containing water. The surface of the immersed TPEs were rubbed against the thumb and two fingers that constitute a grip. The SBR containing TPE of Example 15 had the best wet grip characteristics, that was followed by Example 16, 14, and 13, in the aforementioned order. The Example 15 that contained crosslinked SBR that was crosslinked with phenolic curing agent, had the lowest weight gain (i.e. best oil resistance) and a low compression set. Good oil resistance is required for grips used in power tools, kitchen utensils, pens, stapler holder. Also, good wet grip character is needed in many grip applications that require water contact of the grip, such as toothbrush and shaving handles.

Transmission Electron Microscopy (TEM) was performed on the sample of Example 15 that contained crosslinked SBR with proper staining techniques to identify the three polymeric phases. The SBR phase was observed to be co-continuous phase with the polypropylene and SEBS phases. This demonstrates that a useful oil extended TPE formulation can be prepared with crosslinked SBR, SEBS, and polypropylene where the SBR phase is not the dispersed phase in a co-continuous matrix of polypropylene and SEBS, and the SBR is co-continuous with SEBS and polypropylene.

Table 7 and Table 8 give the masterbatch and the oil extended TPE formulations that were prepared with a higher molecular weight SEBS grade, Kraton G® 1651 that were prepared similarly per the procedure as described in Examples 1-10 respectively. The weight average (Mw) and number average (Mn) molecular weights of Kraton® G 1651 were measured by Size Exclusion Chromatography as 151,000 and 146,000 g/mole respectively. The SEBS to SBR ratio was varied.

TABLE 7

Masterbatch Composition in Weight %

| | No | | | | |
|---|---|---|---|---|---|
| | 17 | 18 | 19 | 20 | 21 |
| Solflex 2515* | 21.2 | 37.05 | 53.35 | — | — |
| Royalene ® IM7100 | — | — | — | 21.2 | 53.35 |
| Atofina 7823 Mz | 21.9 | 22.21 | 22.57 | 21.9 | 22.57 |
| Kraton ® G1651 | 56.9 | 40.74 | 24.08 | 56.9 | 24.08 |
| Total | 100 | 100 | 100 | 100 | 100 |

*amount contains about 7.53 phr (parts per hundred) of talc partitioning agent Masterbatch of Examples 17, 18, 19, 20, and 21 were used to prepare the TPE compositions of Examples 25, 26, 27, 28, and 29 respectively, wherein the respective elastomers (SBR or EPDM) were crosslinked with identical phenolic curing system.

TABLE 8

Soft and Oil Extended TPE Formulations with Kraton ® G 1651: Compositions in Weight %

| | No | | | | | | | |
|---|---|---|---|---|---|---|---|---|
| | 22+ | 23+ | 24+ | 25 | 26 | 27 | 28+ | 29+ |
| Solflex 2515* | — | — | — | 16 | 27.5 | 39 | — | — |
| Royalene ® IM7100♦ | — | — | — | — | — | — | 16 | 39 |
| Atofina 7823 Mz | 15 | 15 | 15 | 15 | 15 | 15 | 15 | 15 |
| Kraton ® G1651 | 55 | 39 | 16 | 39 | 27.5 | 16 | 39 | 16 |
| Kraton ® D1101 | — | 16 | 39 | — | — | — | — | — |
| Renoil 471 | 30 | 30 | 30 | 30 | 30 | 30 | 30 | 30 |
| Total | 100 | 100 | 100 | 100 | 100 | 100 | 100 | 100 |

+Control
*Amount incorporates 7.53 phr of talc, 9.23 phr of Poly-dispersion WBC-559P Firm 50C of Rhein Chemie (65% SP 1055 Phenolic Curative of Schenectady Chemicals), and 1.5 phr of Zinc Oxide powder.
♦Amount incorporates 9.23 phr of Poly-dispersion WBC-559P Firm 50C of Rhein Chemie (65% SP 1055 Phenolic Curative of Schenectady Chemicals), and 1.5 phr of Zinc Oxide powder.

TABLE 9

Properties of Soft and Oil Extended TPE Formulations with Kraton ® G1651

| | No | | | | | | | |
|---|---|---|---|---|---|---|---|---|
| | 22+ | 23+ | 24+ | 25 | 26 | 27 | 28+ | 29+ |
| Shore A Hardness | 60 | 62 | 64 | 60 | 61 | 60 | 62 | 63 |
| Tensile Strength (Mpa) | 8.8 | 5.8 | 6.2 | 8 | 6.3 | 3.9 | 6.7 | 4.6 |
| Tear Strength (N/mm) | 24.9 | 25.2 | 31.2 | 23.8 | 18.4 | 13.3 | 25.5 | 21.8 |
| Flexural Modulus (Mpa) | 8.7 | 12.9 | 15.1 | 11.7 | 15.2 | 12.1 | 12.1 | 13.2 |
| % Compression Set B | | | | | | | | |
| @ 23 C. | 7 | 10 | 13 | 5 | 6.5 | 6.6 | 12 | 15 |
| @ 70 C. | 44 | 59 | 88 | 37 | 33 | 27 | 42 | 39 |
| % Weight Gain IRM Oil 903 | | | | | | | | |
| @ 70 C. | 127 | 114 | 106 | 86 | 68 | 56 | 97 | 88 |

+Control

The crosslinked SBR containing oil extended thermoplastic elastomer Examples 25, 26 and 27 have the lowest compression set and the lowest weight gain in IRM oil 903, when compared with the SBS or crosslinked EPDM or SEBS (sole rubber) containing thermoplastic elastomer compositions.

Transmission Electron Microscopy (TEM) was performed on the samples of Example 25, 26 and 27 that contained crosslinked SBR with proper staining techniques to identify the three polymeric phases. The three examples contained polypropylene phase as a continuous phase with small and dispersed domains of SEBS and large and dispersed domains of crosslinked SBR. The majority of domains of SEBS were greater than 0.1 microns and very few domains of SEBS were greater than 2 microns. The majority of domains of crosslinked SBR were greater than 2 microns and very few domains of crosslinked SBR were less than 0.5 microns. The polypropylene matrix or the continuous phase existed as thin, elongated areas that predominantly surrounded the dispersed domains of SEBS and crosslinked SBR. This demonstrates that a useful and oil extended TPE composition with low compression set and good oil resistance can be obtained with a high molecular weight SEBS, crosslinked SBR, and polypropylene, where the polypropylene phase is the continuous phase and the SEBS and crosslinked SBR are the dispersed phases and the dynamic vulcanization of the rubbery elastomers is carried out in a continuous twin-screw extruder.

It is also possible to adjust the viscosity ratios of the SEBS, SBR, and polypropylene phases, lower polypropylene amounts to make the SEBS as the continuous or matrix phase and polypropylene as the dispersed phase. It is also possible to have the crosslinked SBR as either the dispersed phase in the matrix of SEBS with polypropylene also present as the dispersed phase or crosslinked SBR phase can be made co-continuous with the SEBS phase with polypropylene as the dispersed phase. It is also possible to adjust the viscosity ratios by using paraffinic oils that are more compatible with the polypropylene and SEBS than the crosslinked SBR. It is also possible to use a combination of naphthenic and paraffinic oils.

It is possible to first prepare a masterbatch of polypropylene and the SBR where SBR is dynamically crosslinked or vulcanized in a continuous process. The crosslinked SBR masterbatch can be then added to the SEBS, and oil in the second process step to make an oil extended crosslinked SBR, SEBS, and polypropylene containing composition. Following examples demonstrate this methodology.

TABLE 12

Characterization of Solution SBR Used for Making Crosslinked SBR Masterbatch

| | SBR 3 | SBR 4 | SBR 5 |
|---|---|---|---|
| % Bound Styrene | 25.3 | 24.8 | 24.8 |
| % Vinyl Content | 51 | 14 | 14 |
| Mooney Viscosity (ML1 + 4 @ 100° C.) | 55 | 103 | 52 |
| Base Mw (g/mole) | 342,000 | 558,000 | 272,000 |
| Tg (° C.) Midpoint | −10 | −56 | −56 |

SBR 3 is a high vinyl-containing SBR. SBR 5 is essentially a lower molecular weight version of SBR 4.

Table 13 gives the composition of SBR masterbatches where SBR was dynamically vulcanized in a continuous twin-screw extruder in presence of polypropylene and no SEBS was added in the masterbatch. A peroxide curing agent from Akzo-Nobel was used to crosslink the SBR.

TABLE 13

Composition in Weight % of Crosslinked SBR Masterbatches Prepared by Dynamic Vulcanization

| | No | | |
|---|---|---|---|
| | 34 | 35 | 36 |
| SBR 3 | 59.35 | — | — |
| SBR 4 | — | 59.35 | — |
| SBR 5 | — | — | 59.35 |
| Trigonox ® 101-45B-pd (Akzo Nobel) | 0.92 | 0.92 | 0.92 |
| Talc | 7.77 | 7.77 | 7.77 |
| Polypropylene | 31.96 | 31.96 | 31.96 |
| (Atofina 3825, 30MFI Isotactic Homopolymer) | | | |
| Total | 100 | 100 | 100 |

Table 14 lists the compositions of oil extended TPE formulations. Crosslinked SBR masterbatch of Examples 34, 35, and 36 were respectively used and blended with an SEBS, Oil, and polypropylene copolymer containing concentrate to form compositions of Examples 38, 39 and 40, respectively. The composition of Example 37 (control) that did not contain any crosslinked SBR and contained SEBS as the main rubber component, was prepared by separate additions of the individual components. The compositions were melt mixed above the melting points of polypropylene and were subsequently molded and tested for physical properties.

TABLE 14

Oil Extended Soft TPE Compositions of SEBS and Crosslinked SBR Masterbatch Additions with SEBS

| | No | | | |
|---|---|---|---|---|
| | 37+ | 38 | 39 | 40 |
| XL-SBR 3 | — | 21.14 | — | — |
| XL-SBR 4 | — | — | 21.14 | — |
| XL-SBR 5 | — | — | — | 21.14 |
| Kraton ® G1651 | 60.41 | 39.27 | 39.27 | 39.27 |
| Polypropylene (Atofina 3825, 30MFI Isotactic Homopolymer) | 11.21 | 11.21 | 11.21 | 11.21 |
| Polypropylene (Atofina 7823 Mz Isotactic Copolymer 30MFI) | 10.69 | 10.69 | 10.69 | 10.69 |
| Renoil 471 | 14.96 | 14.96 | 14.96 | 14.96 |
| Talc | 2.73 | 2.73 | 2.73 | 2.73 |
| Total | 100 | 100 | 100 | 100 |

+Control

TABLE 15

Properties of Oil Extended Soft TPE Compositions of SEBS and Crosslinked SBR Masterbatch Additions with SEBS

| | No | | | |
|---|---|---|---|---|
| | 37+ | 38 | 39 | 40 |
| Shore A Hardness | 85 | 83 | 83 | 84 |
| Tensile Strength (Mpa) | 17.4 | 12.2 | 10.2 | 11.2 |
| Tear Strength (N/mm) | 51.3 | 40.2 | 41.8 | 41 |
| Flexural Modulus (Mpa) | 57.7 | 46.2 | 48.6 | 47 |
| % Compression Set B | | | | |
| @ 23 C. | 23.5 | 19.7 | 21.4 | 20.2 |
| @ 70 C. | 53.3 | 41.3 | 43.7 | 43.5 |
| % Weight Gain IRM Oil 903 | | | | |
| @ 70 C. | 67.5 | 49.2 | 53.8 | 56.6 |

+Control

The crosslinked SBR containing oil extended SEBS based thermoplastic elastomers have better compression set and oil resistance than the SEBS control. This demonstrates that the SBR may not be dynamically vulcanized in the presence of SEBS and a blend of crosslinked SBR and polypropylene can be added to SEBS and oil to prepare a useful soft thermoplastic elastomer composition.

It may also be preferred to use the random copolymers of styrene, butadiene, and isoprene or copolymers of isoprene and butadiene that are prepared with solution polymerization techniques to prepare blends of SEBS, polyolefin or polystyrene resins, oil, wherein the said elastomer is crosslinked. Such rubbery and unsaturated copolymers may be highly branched with varying vinyl content from about 5 to about 80 percent.

In following experiments, two non-oil extended compositions as disclosed in U.S. Pat. No. 4,927,882 were mixed in a continuous twin-screw extruder, ZSK-25.

TABLE 16

Composition in Parts

|  | No | | |
|---|---|---|---|
|  | 41+ | 42+ | 43 |
| Solflex ® 2515 | 100 | 100 | 100 |
| Kraton ® G1651 | 50 | 50 | 50 |
| Atofina 3825 polypropylene homopolymer 30MFI | 17 | 30 | 38.25 |
| Vulcup ® 40KE of Geo Specialty Chemicals | 0.625 | 0.625 | 0.625 |
| Kaolin Clay | 7.5 | 7.5 | 7.5 |
| Talc | 3.1 | 3.1 | 3.1 |

+Control

Operating conditions of 300 RPM, 180° C., and about 15 lb/hour were used. The SBR, SEBS and polypropylene were fed into the main feed hopper and peroxide curing agent was added at barrel 5. Samples of Examples 41 and 42 resulted in brittle and inhomogenous material with the extrudate breaking and were not suited to be made in a continuous manner. Samples from Example 43 that contained a larger polypropylene amount were smoother and more homogenous and were better suited to process in a continuous manner. This demonstrates that the compositions of prior art were not suitable to be processed in a continuous process. A continuous process used for dynamically vulcanizing the diene-containing rubbery elastomer is highly desirable for better control of morphology or rubber domains, control of temperature during crosslinking and to provide a better quality.

TPE compositions with two polypropylene variations were prepared per Table 17 with conditions of 150 RPM, 10 lb/hour and 185° C. barrel temperature in a ZSK-25 twin-screw extruder.

TABLE 17

Composition of Masterbatch in Weight %

|  | No | |
|---|---|---|
|  | 44 | 45+ |
| Solflex ® 2515* | 27.7 | 27.7 |
| Kraton ® G1652 | 43.4 | 43.4 |
| Syndiotactic Polypropylene Copolymer Finaplas ® 1751 | 28.9 | — |
| Isotactic Polypropylene | — | 28.9 |
| Copolymer (metallocene catalyst) Finacene ® EOD00-31 | | |
|  | 100 | 100 |

*Include 7.5 phr talc, 13.85 phr of WBC-559P of Rhein Chemie, 2.25 phr of ZnO.
+Control

TABLE 18

Physical Properties

|  | No | |
|---|---|---|
|  | 44 | 45+ |
| Flexural Modulus (Mpa) | 65 | 125 |
| % Weight Gain IRM Oil 903 @ 70° C. | 69 | 54 |

+Control

The TPE composition of Example 44 has the lower flexural modulus that provides a unique feel that can be further improved by adding oil. A lower flexural modulus is possible with syndiotactic polypropylene due to a low crystallinity level as present.

While certain representative embodiments and details have been shown for the purpose of illustrating the subject invention, it will be apparent to those skilled in this art that various changes and modifications can be made therein without departing from the scope of the subject invention.

What is claimed is:

1. An article of manufacture that is comprised of a soft thermoplastic elastomer composition overmolded onto a hard substrate wherein the soft thermoplastic composition is comprised of (a) 15 to 30 parts by weight of a thermoplastic resin selected from the group consisting of polyolefin resins and polystyrene, based upon the total weight of the soft thermoplastic composition, (b) 20 to 40 parts by weight of a rubbery elastomer that is comprised of repeat units that are derived from a conjugated diene monomer selected from 1,3-butadiene and isoprene, based upon the total weight of the soft thermoplastic composition, wherein the rubbery elastomer is at least partially crosslinked, wherein the repeat units in the rubbery elastomer are distributed throughout the rubbery polymer in an essentially random manner, and wherein the rubbery polymer is a solution polymer, (c) 25 to 60 parts by weight of a highly saturated elastomer selected from the group consisting of styrene-ethylene butylene-styrene polymers, styrene-ethylene propylene-styrene polymers, hydrogenated polybutadiene, hydrogenated polyisoprene, hydrogenated styrene-isoprene random copolymers, hydrogenated styrene-butadiene random copolymers, based upon the total weight of the soft thermoplastic composition, and (d) 20 to 70 parts by weight of an oil, based upon the total weight of the soft thermoplastic composition; wherein the soft thermoplastic composition is cured with sulfur or a phenolic curative by dynamic vulcanization.

2. An article of manufacture as specified in claim 1 wherein the thermoplastic resin is a syndiotactic polypropylene having a melt flow rate at 230° C. and 2.16 Kg load of greater than 0.5 g/10 minutes.

3. An article of manufacture as specified in claim 1 wherein the thermoplastic resin is a syndiotactic polypropylene having a melt flow rate at 230° C. and 2.16 Kg load that is within the range from 20 g/10 minutes to about 110 g/10 minutes.

4. An article of manufacture as specified in claim 3 wherein the thermoplastic resin is an isotactic polypropylene copolymer with an alpha-olefin monomer selected from the group consisting of ethylene, butene and hexene which is prepared with non-metallocene catalyst.

5. An article of manufacture as specified in claim 1 wherein the thermoplastic resin is a polyolefin resin that is substantially crystalline and has a melting point of at least 70° C. as measured in a differential scanning calorimeter at a heating rate of 10° C. per minute.

6. An article of manufacture as specified in claim 1 wherein the elastomer is synthesized by solution polymerization and wherein the highly saturated elastomer is crosslinked.

7. An article of manufacture as specified in claim 1 wherein the thermoplastic resin is a polyolefin resin, and wherein the polyolefin resin, the elastomer polymerized by solution polymerization, and the highly saturated elastomer are at least partially crosslinked.

8. An article of manufacture as specified in claim 1 wherein the hard substrate is a thermoplastic resin selected from the group of polypropylene, polyethylene, polystyrene, high impact polystyrene, polycarbonate, polybutylene terphthalate, nylon 6, nylon 11, nylon 12, nylon 6-10, acrylonitrile-butadiene-styrene copolymer, styrene-acrylonitrile copolymer, and polyacetal.

9. An article of manufacture as specified in claim 1 wherein at least 75 percent of the double bonds originally present in the highly saturated elastomer are saturated by hydrogenation.

10. An article of manufacture as specified in claim 1 wherein the soft thermoplastic elastomer composition is further comprised of oils selected from the group of paraffinic and naphthenic oils.

11. An article of manufacture as specified in 1 wherein the soft thermoplastic elastomer composition is further comprised of a reinforcement selected from the group of talc, clay, calcium carbonate, silica, carbon black and wollastonite.

12. An article of manufacture as specified in claim 1 wherein the hard substrate is comprised of a thermoplastic resin and a reinforcement selected from the group consisting of talc, wollastonite, glass fibers, glass spheres, calcium carbonate, and silica.

13. An article of manufacture as specified in claim 1 wherein the rubbery elastomer in the soft thermoplastic elastomer composition is dynamically crosslinked in the melt mixing process step with the polyolefin resin, wherein the rubbery elastomer is comprised of repeat units that are derived from a conjugated diolefin monomer, and wherein said rubbery elastomer is unsaturated.

14. An article of manufacture as specified in claim 1 wherein the soft thermoplastic composition is comprised of a rubbery elastomer that is a styrene-butadiene random copolymer with a bound styrene content of about 10 to 40 weight percent of the said elastomer, wherein the rubbery elastomer is comprised of repeat units that are derived from a conjugated diolefin monomer, and wherein said rubbery elastomer is unsaturated.

15. An article of manufacture as specified in claim 1 wherein the rubbery elastomer is a styrene-isoprene random copolymer having a bound styrene content that is within the range of about 10 to 40 weight percent, and wherein said rubbery elastomer is unsaturated.

16. An article of manufacture as specified in claim 1 wherein the rubbery elastomer has a Mooney ML 1+4 viscosity at 100° C. which is within the range of 15 to about 120, wherein the rubbery elastomer is comprised of repeat units that are derived from a conjugated diolefin monomer, and wherein said rubbery elastomer is unsaturated.

17. An article of manufacture as specified in claim 1 wherein the article of manufacture is selected from the group consisting of shaving razors, toothbrushes, soft-grip pens, power tools, kitchen appliances, kitchen utensils, and keypads.

18. The process as specified in claim 17 wherein the highly saturated elastomer is a styrene-ethylene butylene-styrene triblock copolymer having a styrene content within the range of 15 weight percent to 40 weight percent.

19. An article of manufacture as specified in claim 1 wherein the soft thermoplastic elastomer has a Young's modulus that is at least 10 MPa less than the Young's modulus of the hard substrate.

20. An article as specified in claim 1 wherein the thermoplastic resin is selected from the group consisting of polyethylene, isotactic polypropylene, syndiotactic polypropylene, polypropylene impact copolymers containing about 1-7% by weight of ethylene, butene, hexene, or octene, polyolefin copolymers, polybutene, reactor grade modified polypropylene, oxypolyolefins, and metallocene polypropylene.

21. An article as specified in claim 20 wherein the thermoplastic resin is a polyolefin copolymer having repeat units that are derived from at least two members selected from the group consisting of ethylene, propylene, butene, hexene, and octene.

22. An article as specified in claim 1 wherein the rubbery elastomer is further comprised of repeat units that are derived from a vinyl aromatic monomer selected from the group consisting of styrene and alpha-methyl styrene, and wherein said rubbery elastomer is unsaturated.

23. An article of manufacture as specified in claim 1 wherein the thermoplastic resin is a syndiotactic polypropylene copolymer.

24. An article of manufacture as specified in claim 1 wherein the hard substrate is a thermoplastic resin.

25. An article of manufacture as specified in claim 1 wherein the hard substrate is a metal.

26. An article of manufacture as specified in claim 1 wherein the thermoplastic resin is polystyrene.

27. An article of manufacture as specified in claim 1 wherein the soft thermoplastic composition is further comprised of a rubbery polymer selected from the group consisting of ethylene-propylene-diene rubber, butyl rubber, halobutyl rubber, ethylene-co-octene elastomer, ethylene-co-hexene elastomer, ethylene-co-butene elastomer, halogenated rubber copolymers of p-alkylstyrene and at least one isomonoolefin having from 4 to 7 carbon atoms, and nitrile rubber.

28. An article of manufacture as specified in claim 1 wherein the highly saturated elastomer is hydrogenated polybutadiene.

29. An article of manufacture as specified in claim 1 wherein the highly saturated elastomer is hydrogenated polyisoprene.

30. An article of manufacture as specified in claim 1 wherein the highly saturated elastomer is hydrogenated styrene-isoprene random copolymer.

31. An article of manufacture as specified in claim 1 wherein the highly saturated elastomer is hydrogenated styrene-butadiene random copolymer.

32. An article of manufacture that is comprised of a soft thermoplastic elastomer composition overmolded onto a hard substrate wherein the soft thermoplastic composition is comprised of (a) 15 to 25 parts by weight of a polyolefin resin, based upon the total weight of the soft thermoplastic composition, (b) 45 to 55 parts by weight of a rubbery elastomer that is comprised of repeat units that are derived from a conjugated diene monomer selected, from 1,3-butadiene and isoprene, based upon the total weight of the soft thermoplastic composition, wherein the rubbery elastomer is at least partially crosslinked, wherein the repeat units in the rubbery elastomer are distributed throughout the rubbery elastomer in an essentially random manner, and wherein the rubbery elastomer is a solution polymer, and (c) 25 to 35 parts by weight of a highly saturated elastomer selected from the group consisting of styrene-ethylene butylene-styrene polymers, styrene-ethylene propylene-styrene polymers, hydrogenated polybutadiene, hydrogenated polyisoprene, hydrogenated styrene-isoprene random copolymers, hydrogenated styrene-butadiene random copolymers, based upon the total weight of the soft thermoplastic composition, and (d) 20 to 70 parts by weight of an oil, based upon the total weight of the soft thermoplastic composition.

33. An article of manufacture that is comprised of a soft thermoplastic elastomer composition overmolded onto a hard substrate wherein the soft thermoplastic composition consists of (a) 15-30 parts by weight of a thermoplastic resin selected from the group consisting of polyolefin resins and polystyrene, based upon the total weight of the soft thermoplastic composition, (b) 20 to 40 parts by weight of a rubbery elastomer that is comprised of repeat units that are derived from a conjugated diene monomer selected from 1,3-butadiene and isoprene, based upon the total weight of the soft thermoplastic composition, wherein the rubbery elastomer is at least partially crosslinked, wherein the repeat units in the rubbery elastomer are distributed throughout the rubbery elastomer in an essentially random manner, and wherein the rubbery elastomer is a solution polymer, (c) 25 to 60 parts by weight of a highly saturated elastomer selected from the group consisting of styrene-ethylene butylene-styrene polymers, styrene-ethylene propylene-styrene polymers, hydrogenated polybutadiene, hydrogenated polyisoprene, hydrogenated styrene-isoprene random copolymers, hydrogenated styrene-butadiene random copolymers, based upon the total weight of the soft thermoplastic composition, and (d) 20 to 70 parts by weight of an oil, based upon the total weight of the soft thermoplastic composition, (e) optionally, an antioxidant, (f) optionally, an ultraviolet light stabilizer, and (g) optionally, a colorant; wherein the soft thermoplastic composition is cured with sulfur or a phenolic curative by dynamic vulcanization.

34. An article of manufacture as specified in claim 33 wherein the highly saturated elastomer is hydrogenated polybutadiene.

35. An article of manufacture as specified in claim 33 wherein the highly saturated elastomer is hydrogenated polyisoprene.

36. An article of manufacture as specified in claim 33 wherein the highly saturated elastomer is hydrogenated styrene-isoprene random copolymers.

37. An article of manufacture as specified in claim 33 wherein the highly saturated elastomer is hydrogenated styrene-butadiene random copolymers.

38. An article of manufacture as specified in claim 33 wherein the soft thermoplastic composition is cured with a phenolic curative.

39. An article of manufacture as specified in claim 33 wherein the soft thermoplastic composition is cured with sulfur.

* * * * *